United States Patent [19]

Castonguay

[11] 4,395,602
[45] Jul. 26, 1983

[54] ISOLATION SHIELD FOR CIRCUIT BREAKER COMPARTMENT SECONDARY DISCONNECTS

[75] Inventor: Roger N. Castonguay, Terryville, Conn.

[73] Assignee: General Electric Company

[21] Appl. No.: 349,333

[22] Filed: Feb. 16, 1982

[51] Int. Cl.³ .............................................. H01H 9/00
[52] U.S. Cl. ................................ 200/50 AA; 361/345
[58] Field of Search .......................... 200/50 AA, 304; 361/345

[56] References Cited

U.S. PATENT DOCUMENTS 3,920,939 11/1975 Ciboldi et al. ................. 200/50 AA
4,020,301 4/1977 Ericson et al. ................. 200/50 AA Primary Examiner—A. T. Grimley
Assistant Examiner—Morris Ginsburg
Attorney, Agent, or Firm—Richard Menelly; Walter Bernkopf; Fred Jacob

[57] ABSTRACT

A slideably mounted insulating shield is positioned over the terminals of a secondary disconnect attached to the side wall of a circuit breaker compartment. Inserting the circuit breaker into the compartment brings the secondary disconnect terminals on the breaker into engagement with the secondary disconnect terminals in the compartment by displacing the insulating shield. Removal of the breaker from the compartment forces the insulating shield to return to position over the compartment secondary disconnect terminals thereby isolating the disconnect terminals from inadvertent contact with an operator.

9 Claims, 6 Drawing Figures

ISOLATION SHIELD FOR CIRCUIT BREAKER COMPARTMENT SECONDARY DISCONNECTS

BACKGROUND OF THE INVENTION

U.S. Pat. No. 4,020,301 entitled, "Drawout Apparatus Having Improved Secondary Contact Mounting Provisions" describes a plurality of switchboard secondary disconnect terminals mounted for engagement with a corresponding plurality of secondary contact termainals on the side wall of a drawout type circuit breaker. This patent is incorporated herein for purposes of reference. When the circuit breaker is removed from the breaker compartment, the compartment disconnect terminals, which are electrically energized, become exposed. As described in the aforementioned patent, a variety of accessorial functions are served by external auxiliary circuits such that the breaker compartment secondary disconnect terminals continuously carry electrical energy for operating the accessories. Upon removal of the breaker from the breaker compartment, an operator could come into injurious contact with any one of the energized and exposed secondary disconnect terminals. The purpose of the instant invention is to provide means for electrically and mechanically isolating the secondary disconnect terminals on the side surface of the breaker compartment when the breaker is removed from the compartment.

SUMMARY OF THE INVENTION

An insulating shield is attached to the side wall of a circuit breaker compartment superjacent the compartment secondary disconnect terminals. The shield isolates the secondary disconnect terminals when the breaker is removed from the compartment. Upon insertion of the breaker within the breaker compartment, a portion of the breaker secondary disconnect assembly engages the insulating shield and slidingly moves the shield away from the secondary disconnect terminals on the side wall of the breaker compartment. As long as a portion of the breaker disconnect assembly engages the compartment secondary disconnect shield, the shield is held against the tension of a pair of linear return springs. Removing the breaker from the compartment removes the breaker secondary disconnect assembly from contact with the insulating shield, thereby allowing the shield to move back into position over the compartment secondary disconnect terminals under the force provided by the linear springs.

DESCRIPTION OF THE PREFERRED EMBODIMENT

Figure 1:
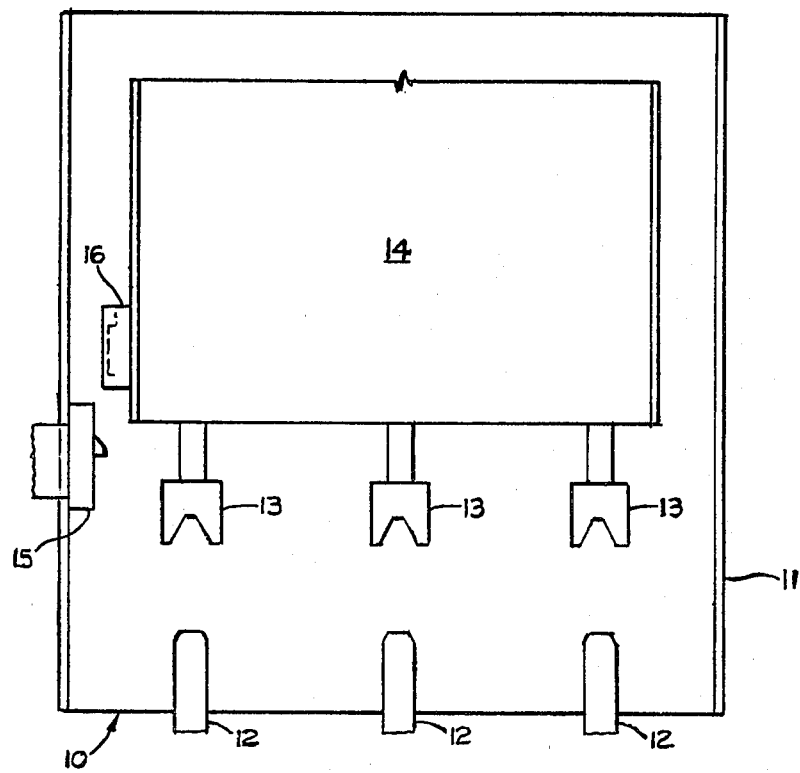
FIG. 1 is a plan view of a circuit breaker inserted partway within a circuit breaker compartment.

FIG. 1 contains a circuit breaker compartment 10 similar to that described within the aforementioned U.S. patent and consisting of a housing 11 containing a plurality of line stabs 12 for mating with a corresponding plurality of line receivers 13 mounted on the rear section of a drawout type circuit breaker 14. Line stabs 12 provide the primary source of power for connection with circuit breaker 14. A secondary source of power is provided within housing 11 by means of a compartment secondary disconnect 15, hereafter "compartment disconnect," attached to the side wall of housing 11. When breaker 14 is completely inserted within breaker compartment 10, line receivers 13 connect with line stabs 12 and circuit breaker secondary disconnect 16, hereafter "breaker disconnect," connects with compartment disconnect 15.

Figure 2:
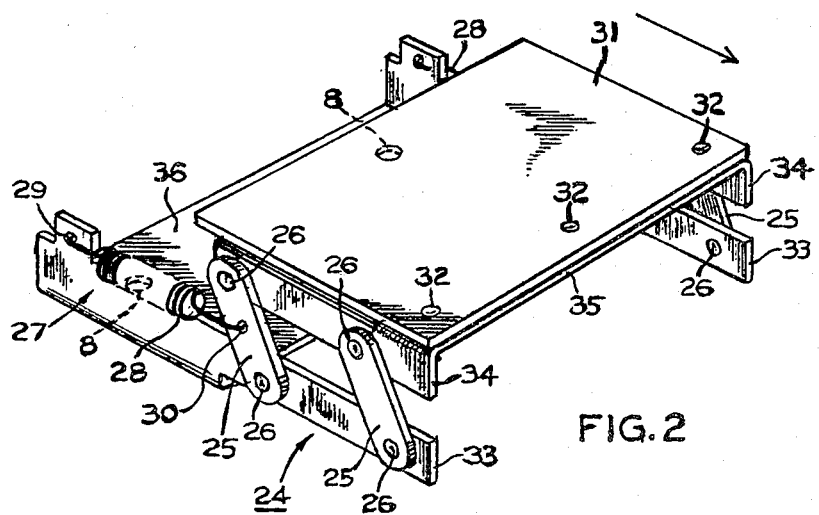
FIG. 2 is a top perspective view of the shield assembly according to the invention.

Shield assembly 24, shown in FIG. 2, consists of an insulating shield 31 and a shield frame 27 and isolates the compartment disconnect 15 when circuit breaker 14 is removed from breaker compartment 10. Shield assembly 24 contains four moveable links 25, two on each side of the assembly connected between a pair of top plates 34 and a pair of bottom plates 33 by means of pivot pins 26. Pivot pins 26 are connected to top and bottom plates 34, 33 with sufficient play to allow insulating shield 31 and top plate 34 to move in the direction indicated. A support plate 35 extends between top plates 34 and can be stamped from one piece of sheet metal which includes top plates 34 or can be attached to plates 34 by means of brazing or welding. Insulating shield 31 is attached to cross plate 35 by means of rivets 32. A support plate 36 extends between bottom plates 33 and can be stamped from one piece of sheet metal which includes bottom plates 33 or can be attached to the plates by means of brazing or welding. A pair of return springs 28 are connected on opposite sides of bottom plates 33 by means of spring slots 29 on bottom plates 33 at one end and spring slots 30 on moveable links 25 at opposite ends. In operation, insulating shield 31 is moved in the direction indicated against the tension provided by means of return springs 28.

Figure 3:
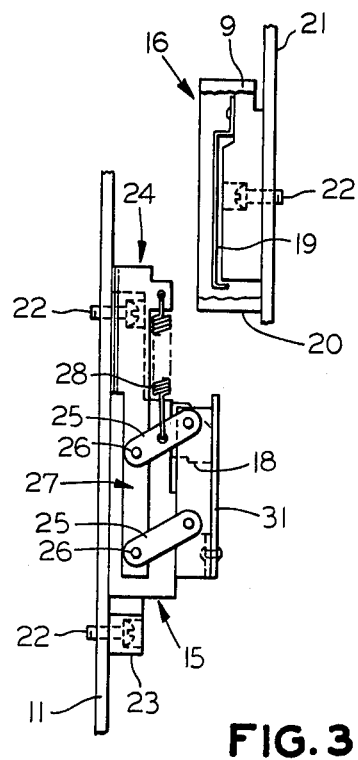
FIG. 3 is a side view of the secondary disconnect on the wall of the breaker compartment shown in FIG. 1 with the shield assembly of the invention intermediate the circuit breaker secondary disconnect.

Shield assembly 24 is attached to housing 11 within breaker compartment 10 as shown in FIG. 3. Support plate 36 is attached by insertion of screws 22 through screw holes 8 and fastening screws 22 to housing 11. Insulating shield 31 is positioned over the compartment disconnect terminals 18 to effectively isolate the terminals until some means is used to move insulating shield 31 in the direction indicated in FIG. 2. The breaker disconnect 16 is shown attached to the side wall 21 of circuit breaker 14 by means of screws 22 extending through the bottom of insulated support 20 and fastened to the circuit breaker side wall. An insulated casing 9 is used to support the circuit breaker secondary terminals 19 as described in the aforementioned U.S. patent. In FIG. 3, the breaker disconnect 16 is shown in isometric relation to the compartment disconnect 15 with shield assembly 24 positioned on the compartment disconnect. Insulating shield 31 is superposed on the compartment disconnect terminals 18 with moveable links 25 positioned relative to pivot pins 26 by return springs 28 in their normal, non-extended condition.

Figure 4:
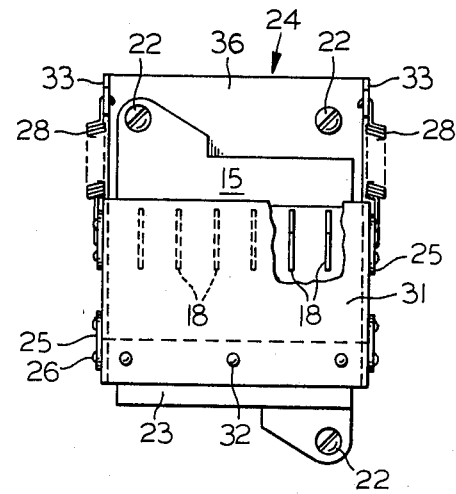
FIG. 4 is a plan view of the breaker compartment secondary disconnect and shield assembly shown in FIG. 3.

FIG. 4 shows shield assembly 24 superposed on compartment disconnect 15 with insulated shield 31 effectively isolating the compartment disconnect terminals 18. Also shown is the common attachment of shield assembly 24 by means of screws 22 which also hold the compartment disconnect 15 to the circuit breaker compartment housing 11 as shown in FIG. 3 through the insulated compartment disconnect base 23.

Figure 5:
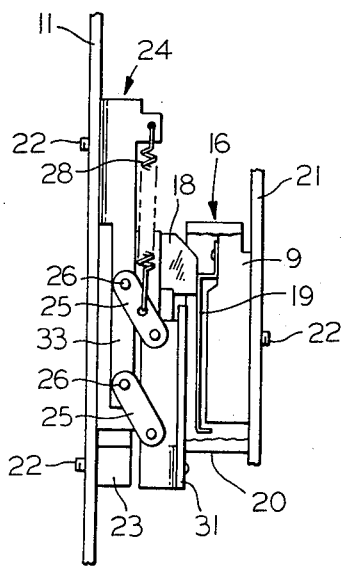
FIG. 5 is a side view of the compartment secondary disconnect contingent with the circuit breaker secondary disconnect and the shield assembly slideably extended.
Figure 6:
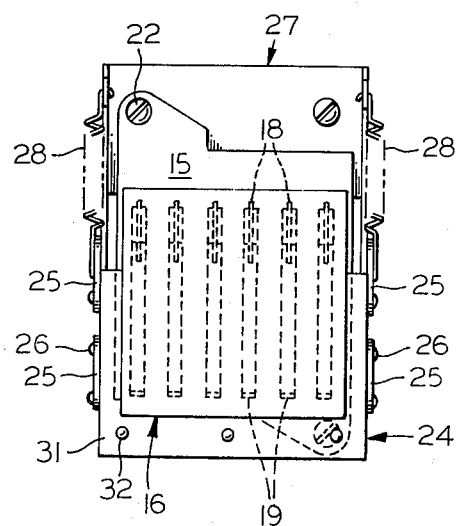
FIG. 6 is a plan view of the compartment secondary disconnect, the circuit breaker secondary disconnect and shield assembly shown in FIG. 5.

When circuit breaker 14 of FIG. 1 is advanced completely within circuit breaker compartment 10, the breaker disconnect 16, mounted to the breaker side wall 21 as shown earlier in FIG. 3, contacts the compartment disconnect 15 in such a manner that the insulated support 20 on breaker disconnect 16 engages the forward portion of insulating shield 31 moving insulating shield 31, moveable links 25 and return springs 28 in the extended position shown in FIG. 5 and bringing the breaker disconnect terminals 19 into physical and electrical contact with the compartment disconnect terminals 18. The extension of insulating shield 31 of shield assembly 24 and the exposed compartment disconnect terminals 18 on the compartment disconnect 15 is shown in FIG. 6. Return springs 28 are extended and moveable links 25 are rotated clockwise about pivot pins 26. Retracting circuit breaker 14 (FIG. 1) from within circuit breaker compartment 10 moves the insulated support 20 of the breaker disconnect 16 away from contact with insulated shield 31 on the compartment disconnect 15 causing the moveable links 25 to rotate in a counterclockwise direction about pivot pins 26 under the force applied by return spring 28, thereby returning insulating shield 31 to the normal position shown in FIGS. 3 and 4.

I claim:

1. An insolation shield assembly in combination with circuit breaker compartment secondary disconnects within a circuit breaker compartment which contains a primary and a secondary source of current comprising:
    an electrically insulating shield in superposed relation to a plurality of circuit breaker compartment secondary disconnect terminals connnected with said secondary current source for isolating said compartment terminals when a circuit breaker is removed from said compartment; and means for moving said shield out of superposed relation to said compartment terminals for exposing said compartment terminals to a corresponding plurality of secondary disconnect terminals on said circuit breaker and for connecting said circuit breaker terminals when said circuit breaker is inserted within said compartment.

2. The combination of claim 1 wherein said moving means includes at least one moveable link pivotally connected between said shield and a bottom plate.

3. The combination of claim 2 further including at least one return spring connecting between said moveable link and said bottom plate for returning said shield to superposed relation to said compartment secondary disconnect terminals when said circuit breaker is removed from said compartment.

4. The combination of claim 3 including a pair of top plates, one on either side of said shield for providing support means to said shield.

5. The combination of claim 4 further including a cross plate connecting between said pair of top plates for providing further support to said shield.

6. The combination of claim 2 wherein said bottom plate includes means defining an opening for positioning said shield over said breaker compartment secondary disconnect terminals.

7. The combination of claim 5 wherein said moveable link loosely connects between said bottom plate and said cross plate whereby contact with said shield by said circuit breaker causes said moveable link to rotate in a clockwise direction against the force provided by said return spring.

8. A circuit breaker compartment comprising, in combination:
    a closure for receiving a circuit breaker;
    a plurality of line and load stabs extending from a rear portion of said closure for mating with a corresponding plurality of line and load receivers extending from a rear portion of a circuit breaker;
    a plurality of compartment secondary disconnect terminals attached to a side wall of said closure for mating with a corresponding plurality of circuit breaker secondary disconnect terminals on a side portion of said circuit breaker; and
    a slideably mounted shield assembly attached to said closure side wall for isolating said compartment secondary disconnect terminals when said circuit breaker is moved at least partially out of said compartment.

9. The compartment of claim 8 wherein said shield assembly comprises:
    an insulating shield extending between a pair of top plates, one on either side of said insulating shield;
    a pair of moveable links pivotally connected on either side of said insulating shield between a bottom plate and said top plates for moving said insulating shield out of superposition with said compartment secondary disconnect terminals upon contact wih an insulating support on said circuit breaker secondary disconnect terminals; and
    spring means connecting between said bottom plate and said moveable links for providing return motive force for returning said insulating shield to superposition with said compartment secondary disconnect terminals when said insulating support no longer contacts said shield.

* * * * *